UNITED STATES PATENT OFFICE 2,251,695

PREPARATION OF FATTY ACID ESTERS OF ALIPHATIC HYDROXY COMPOUNDS

Nathaniel Beverley Tucker, Glendale, Ohio, assignor to The Procter & Gamble Company, Cincinnati, Ohio, a corporation of Ohio No Drawing. Application March 20, 1939,
Serial No. 263,059

12 Claims. (Cl. 260—410)

The present invention relates to a method of making fatty acid esters, and finds particular use in the manufacture of fatty acid esters of aliphatic hydroxy carboxylic acids and of hydroxyalkyl esters of said hydroxy carboxylic acids by reaction of the hydroxy compound with a halide of the fatty acid. Such a reaction may be specifically illustrated by the following equation in which lauric acid chloride is reacted with tartaric acid to form tartaric acid mono laurate.

$$CH_3(CH_2)_{10}COCl + COOH(CHOH)_2COOH \rightarrow$$
$$COOH \cdot CHOH \cdot CHOOC(CH_2)_{10}CH_3 \cdot COOH + HCl$$

General reactions may be written as follows.

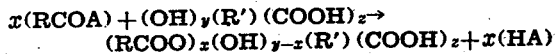

and/or

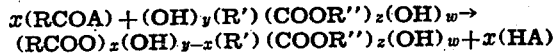

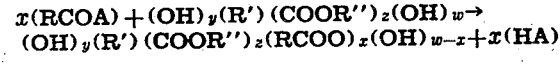

in which A=halogen
RCO=acyl
R'=hydrocarbon skeleton
R''=hydrocarbon skeleton
$(OH)_w$=hydroxyl groups attached to R''
$w$, $x$, $y$ and $z$=small whole numbers, $w$ and $y$ being larger than or equal to $x$.

This application is a continuation-in-part of my copending application Ser. No. 224,359, filed August 11, 1938.

The principal object of the invention is to provide a more convenient and efficient means for the reaction of acyl halides with aliphatic hydroxy compounds. Other objects of my invention will be apparent from the following description.

The accepted method of carrying out the reaction of an acyl halide with an aliphatic hydroxy substance is to react the compounds in the presence of an acid binding agent such as pyridine or quinoline to take up the hydrohalic acid formed (see, for example, Lassar-Cohn's "Arbeitsmethoden für Organischen Chemische Laboratorien," page 5 et seq. (1923)). In many cases involving the use of aroyl halides such as benzoyl chloride, aqueous alkali may be used.

The disadvantage of the above prior methods of forming the esters is that inferior products in general result, that is, poor yields of ester and therefore impure products requiring purification are ordinarily obtained. Moreover, the products prepared in accordance with the prior art from higher molecular fatty acids and water soluble aliphatic hydroxy carboxylic acids, which products have been found to possess the important property of decreasing the interfacial tension at an oil-water interface and which are therefore emulsifying agents, are comparatively low in their effectiveness in this important property. Furthermore, the acid binding agent, pyridine for example, forms a gummy, non-volatile salt (e. g. impure pyridine hydrohalide) with the hydrogen halide evolved and can not be recovered completely nor removed from the reaction product by low temperature distillation as is the case with the type of solvent employed in my process. An aqueous acid wash is ordinarily employed to remove pyridine from the product and the pyridine must then be worked up from a dilute aqueous solution which has been made alkaline in order to recover the acid binding agent.

The following description of my invention will be devoted mainly to the acylation of water soluble aliphatic hydroxy carboxylic acids.

I have discovered that by reacting the acyl halide and the hydroxy acid, for example, in the presence of 1—4 cyclic ether type solvent capable of forming a transient or unstable complex compound with the acyl halide, the reaction time is markedly reduced and superior products, as regards purity, color, and surface activity result.

The following example will clearly illustrate in what manner my invention may be practiced, it being understood that the specific limitations are by way of example only and that the scope of the invention is not to be limited thereto but rather by the breadth of the appended claims.

*Example.*—300 parts of dl-malic acid and 800 parts dioxane are charged into a suitable reaction vessel fitted with a reflux condenser and heated to boiling. 600 parts of the chlorides of the fatty acids derived from substantially completely hydrogenated cottonseed oil are then added slowly, over a period of about fifteen minutes. After all the acid chlorides have been added, the mixture is boiled under the reflux condenser for about forty-five minutes or until the evolution of hydrochloric acid gas substantially ceases. The reflux condenser is then replaced by a distilling tube and condenser. The solvent (dioxane) is distilled out with the aid of a slow stream of inert gas such as nitrogen (chiefly for agitation) under partial vacuum, keeping the temperature at 90–100° C. About 95 per cent of the dioxane may thus be recovered. The residue in the reaction vessel is then heated under a 28–30 inch vacuum at 130° C. for about thirty minutes, left to stand for about six hours to allow solid impurities to partially settle, and then filtered with the addition of about one half per cent of filter aid such as kieselguhr. The resulting product, which consists predominantly of malic stearate, is light in color and possesses superior surface activity as compared to the product prepared in accordance with prior art methods.

An important feature of my invention is the employment of a particular type of solvent which I refer to broadly as a solvent of the 1—4 cyclic ether type. The most common and readily available solvent of this class is dioxane, which boils at approximately 101° C. and has the formula,

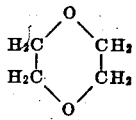

This particular solvent appears to be universally adapted for use in the practice of my invention, but simple derivatives of dioxane such as the methyl and ethyl derivatives may also be employed provided the boiling point of the solvent is below the temperature of decomposition of the reactants and of the reaction product and provided the aliphatic hydroxy compound is at least slightly soluble in same.

The explanation for the superior results obtained with the use of solvents of the 1—4 cyclic ether type is not positively known as far as I am aware. My theory, to which of course I am not limited, is that at least part of the improved action is due to the formation of an easily decomposable oxonium compound between the cyclic ether solvent and the carboxylic acid halide which thereby makes the halide more active and speeds up the esterification reaction. Also the esterification is probably forced toward completion by the tendency of the solvent vapors to sweep the evolved hydrogen halide gas from the reaction zone. Such a combination of conditions of course makes possible the avoidance of high reaction temperatures which tend to cause thermal decomposition. Only solvents of the above type appear to give the superior results I have observed. Such solvents as iso-propyl ether, petroleum ether, acetone, and benzol, have been tried and have failed to give the improved result noted when the 1—4 cyclic ether type solvent is employed.

Another advantage resulting from the use of a cyclic ether type solvent is the comparative ease with which it is substantially completely separated from the reaction mixture and recovered for re-use. In my invention, the solvent may be separated from the reaction product by distillation, or other methods, such as extraction, and in the case of those products which are not too water soluble I have found it practicable to recover the ester by pouring the dioxane mixture into water and separating the ester mechanically or by extraction with ethyl ether or other water insoluble fat solvents.

In carrying out the esterification reaction in accordance with my invention, I prefer to add the acyl halide slowly to the boiling mixture of cyclic ether solvent and aliphatic hydroxy compound, since by this procedure the hydrohalic gas is liberated gradually and there is ample condensing surface for condensing the solvent and therefore there is a minimum of entrainment of solvent in the gas evolved with accompanying minimum solvent loss. If suitable condensing equipment is provided for avoiding such loss of solvent, however, the acyl halide, aliphatic hydroxy compound and solvent may be charged to the reaction vessel in reacting proportions and subsequently boiled under reflux with the formation of a similarly superior product. The completeness of the reaction may be judged by testing the gases at the head of the reflux condenser with an indicator such as moist litmus paper. When there is little indication that hydrogen halide is being evolved, then the reaction has reached substantial completion.

As above stated the higher fatty acid esters of hydroxy carboxylic acids have been found to be surface active and they therefore find use in various arts as wetting, emulsifying and penetrating agents. The preparation of such compounds is thus an important application of my invention. The higher fatty acids which are preferably employed are those saturated and unsaturated aliphatic acids containing eight or more carbon atoms in the molecule, such as lauric, palmitic, stearic, oleic, linolic, etc. Mixed fatty acids derived from natural fats, oils and waxes such as coconut oil, tallow, soybean oil, cottonseed oil, sperm oil, and from the hydrogenated products of same, etc., may also be employed to advantage. Synthetic fatty acids such as those obtained by the oxidation of paraffin may be used likewise, fractions having saponification numbers falling within the range of 190 to 270 being especially useful. Hydroxy acids other than malic acid, as shown in the example, such as tartaric, gluconic, xylonic, mannonic and their alkyl or hydroxy alkyl esters such as mono- or diglycol tartrate, mono-, di- or triglycol citrate, and the mono- or diglycerin ester of malic acid may be employed in the practice of this important feature of my invention. When the hydroxy compound possesses more than one hydroxyl group, any degree of completeness of esterification of the aliphatic hydroxy compound may be effected by employing the proper proportion of reactants. Thus malic oleate, tartaric mono or distearate, gluconic monolaurate and other such esters may be prepared in a manner similar to that exemplified above.

Furthermore, while I have described in detail the important aspect of my invention involving the formation of the higher molecular weight esters, it should be understood that the process may also be employed to form corresponding esters of aliphatic fatty acids having less than eight carbon atoms per molecule, such as butyric, valeric, propionic, etc.

Moreover, the reaction is preferably carried out with the use of the chlorides of the fatty acids, primarily because of their relative ease of preparation and stability, but of course if it should prove advantageous, other halides such as the bromides may be employed.

Those versed in the art are aware that not all esterification processes involve the reaction between acid halide and the aliphatic hydroxy substance. In the case of simple esterifications of free fatty acid with ethyl alcohol, glycol, or even with glycerol for example, a heating of a properly proportioned mixture of constituents to the necessary temperature for reaction is usually sufficient. However, when the hydroxy compound contains in addition to the hydroxyl group a substituent group such as a carboxyl group which is capable of reaction with the hydroxyl group, then it is desirable always to direct and control the esterification desired and thereby avoid inner esterification and consequent formation of products of polymerization. In the case of esterification of such hydroxy acids with aliphatic acids, this desired control may be accomplished by the employment of a halide of the fatty acid instead of the fatty acid itself, and in such a process the present invention finds particular use because the presence of the cyclic ether type solvent not only reduces the time but also the temperature of reaction and results in the production of even purer products having a wider range of application. Therefore, in those cases where the fatty acid halide reaction is not necessary to effect the desired esterification, there may be little or no advantage in the employment of the process covered herein although it is obviously operative in such reactions. My invention may thus be employed in the simple esterification reactions involving hydroxy substances at least partially soluble in the solvent such as mono- and polyhydroxy alcohols such as lauryl alcohol, glycerol, sorbitol, etc., as well as to reactions involving other hydroxy substances such as castor oil or its fatty acids.

Having thus described my invention, what I claim and desire to secure by Letters Patent is:

1. In the process of forming an ester of a fatty acid and an aliphatic hydroxy compound, the step of reacting an acyl halide with said aliphatic hydroxy compound in the presence of a boiling solvent of the 1—4 cyclic ether type.

2. In the process of forming an ester of a fatty acid and an aliphatic hydroxy compound, the step of reacting an acyl halide with said aliphatic hydroxy compound in the presence of boiling dioxane.

3. The process of forming an ester of a fatty acid and an aliphatic hydroxy compound, which comprises boiling a mixture of an acyl halide, an aliphatic hydroxy compound, and a solvent of the 1—4 cyclic ether type until the evolution of hydrogen halide gas substantially ceases.

4. The process of forming an ester of a fatty acid and an aliphatic hydroxy compound, which comprises boiling a mixture of an acyl halide, an aliphatic hydroxy compound, and a solvent of the 1—4 cyclic ether type, and refluxing the solvent vaporized until the evolution of hydrogen halide gas substantially ceases.

5. The process of forming an ester of a fatty acid and an aliphatic hydroxy compound, which comprises boiling a mixture of an acyl halide, an aliphatic hydroxy compound, and a solvent of the 1—4 cyclic ether type, refluxing the solvent vaporized until the evolution of hydrogen halide gas substantially ceases, and subsequently separating the reaction product from the solvent.

6. The process of forming an ester of a fatty acid and an aliphatic hydroxy compound, which comprises boiling a mixture of an acyl halide, an aliphatic hydroxy compound, and a solvent of the 1—4 cyclic ether type, refluxing the solvent vaporized until the evolution of hydrogen halide gas substantially ceases, and subsequently distilling the solvent from the reaction product.

7. The process of forming an ester of a fatty acid and an aliphatic hydroxy compound, which comprises boiling a mixture of an acyl halide, an aliphatic hydroxy compound, and a solvent of the 1—4 cyclic ether type, refluxing the solvent vaporized until the evolution of hydrogen halide gas substantially ceases, mixing the products of the reaction with water, and separating the fatty acid ester.

8. The process of forming an ester of a fatty acid and a water soluble aliphatic hydroxy carboxylic acid which comprises adding an acyl halide to a boiling mixture of an aliphatic hydroxy carboxylic acid and dioxane, and after the addition is complete, boiling the mixture until the evolution of hydrogen halide gas substantially ceases, and subsequently separating the reaction product from the solvent.

9. The process of forming a surface active ester comprising reacting an acyl halide having eight or more carbon atoms in the molecule with a water soluble aliphatic hydroxy carboxylic acid in the presence of boiling dioxane.

10. The process of forming a surface active ester comprising reacting a fatty acid chloride having eight or more carbon atoms in the molecule with a water soluble aliphatic hydroxy carboxylic acid in the presence of boiling dioxane.

11. The process of forming a surface active ester comprising reacting a fatty acid chloride consisting predominantly of stearyl chloride with malic acid in the presence of boiling dioxane.

12. The process of forming a surface active ester comprising boiling a mixture of stearyl chloride, malic acid and dioxane, refluxing the solvent vaporized until the evolution of hydrogen halide gas substantially ceases, and subsequently separating the reaction product from the solvent.

NATHANIEL BEVERLEY TUCKER.